United States Patent
Franet et al.

(10) Patent No.: US 6,832,467 B2
(45) Date of Patent: Dec. 21, 2004

(54) WINDROW GROUPER WITH PIVOTABLE PLATFORM

(75) Inventors: Roger Franet, Sarreguemines (FR); Damien Faivre, Apremont (FR); David Demesmay, Besancon (FR)

(73) Assignee: Deere & Company, Moline, IL (US)

( * ) Notice: Subject to any disclaimer, the term of this patent is extended or adjusted under 35 U.S.C. 154(b) by 469 days.

(21) Appl. No.: 09/850,924

(22) Filed: May 8, 2001

(65) Prior Publication Data

US 2001/0045087 A1 Nov. 29, 2001

(30) Foreign Application Priority Data

May 16, 2000 (DE) .......................................... 100 24 040

(51) Int. Cl.[7] ......................... A01D 43/00; A01D 57/26; A01D 57/28; A01D 57/30
(52) U.S. Cl. ....................................................... 56/192
(58) Field of Search ......................... 56/192, 228, 181, 56/182, 189, DIG. 5, DIG. 21

(56) References Cited

U.S. PATENT DOCUMENTS

| 4,590,751 | A | * | 5/1986 | Stephenson | 56/192 |
|---|---|---|---|---|---|
| 4,757,672 | A | | 7/1988 | Roger | |
| 5,031,393 | A | * | 7/1991 | Rostoucher | 56/154 |
| 5,351,468 | A | * | 10/1994 | Pominville | 56/192 |
| 6,145,289 | A | * | 11/2000 | Welsch et al. | 56/192 |

FOREIGN PATENT DOCUMENTS

| EP | 0439991 A1 | * | 7/1991 | .......... A01D/57/20 |
|---|---|---|---|---|
| GB | 2088684 | | 6/1982 | |

* cited by examiner

*Primary Examiner*—Árpád Fábián Kovács

(57) ABSTRACT

A pull-type mower-conditioner has a windrow grouper mounted to its main frame by a mounting frame that is swingable between lowered working and raised non-working positions. The grouper includes a conveying arrangement defined in part by a belt conveyor mounted to the mounting frame for free pivotal movement, between angularly spaced stops, about a transverse horizontal axis. When the mounting frame is in its working position, the crop-receiving surface of the conveyor is inclined at a slight angle downward toward the rear of the mower-conditioner with gravity holding the conveyor in position against one of the stops. When the mounting frame is in its non-working position, gravity holds the conveyor in a position rotated against the other of the stops, the crop-receiving surface then being almost vertical so that the grouper is almost within the length of the mower-conditioner.

10 Claims, 2 Drawing Sheets

WINDROW GROUPER WITH PIVOTABLE PLATFORM

FIELD OF THE INVENTION

The invention concerns a windrow or swath grouper of a mowing implement, such as a windrower, with a conveying arrangement and a vertically movable frame to connect the conveying arrangement with the mowing implement.

BACKGROUND OF THE INVENTION

GB-A-20 88 684 discloses a towed crop windrowing implement with a windrow or swath grouper in the region of its output side. The windrow grouper includes a screw conveyor in a conveyor housing, which takes in mowed crop and delivers it at the side of the mowing implement. The grouper arrangement is carried by a frame on the windrowing implement and can be pivoted vertically between a raised, non-operating position and a lowered operating position. When the conveyor housing is pivoted from the operating position into the non-operating position, it follows a circular path and moves to the rear away from the windrowing implement.

U.S. Pat. No. 4,757,672 discloses a windrowing implement having a windrow grouper arrangement including a longitudinal beam that is mounted to the frame of the implement for being swung vertically between a raised non-working position, where the grouper is moved further away from the implement frame, and a lowered working position. In addition, the grouper, which is in the form of a rotating conical drum, is mounted to the rear end of the beam for being selectively tilted about a horizontal transverse axis to different orientations relative to the vertical.

The problem underlying the invention is seen in the fact that with known swath arrangements the assembled length of the mowing implement increases when the swath arrangement moves into its non-operating position. This is a particular disadvantage when the mowing implement is to be transported endwise on a public road, since the increase in length results in an increase in transport width.

SUMMARY OF THE INVENTION

According to the present invention there is provided an improved grouper arrangement.

A broad object of the invention is to prove a windrow grouper arrangement which is mounted to a mowing implement, such as a windrower, for being pivoted vertically between working and non-working positions without increasing the length of the implement.

A more specific object of the invention is to provide a windrow grouper attachment, as set forth in the previous object, wherein the grouper is supported at the rear end of its mounting frame for gravitating to a new orientation relative to its mounting frame as the mounting frame is raised to the non-working position, the new orientation of the grouper resulting in no increase in the length of the implement and grouper.

Another object of the invention is to provide a grouper attachment, as set forth in the immediately preceding object, wherein the grouper is in the form of a belt conveyor mounted such that the conveyor hangs with its conveying surface disposed substantially vertical when the grouper attachment mounting frame is raised to its non-working position.

These and other objects will become apparent from a reading of the ensuing description together with the appended drawings.

DESCRIPTION OF THE PREFERRED EMBODIMENT

Figure 1:
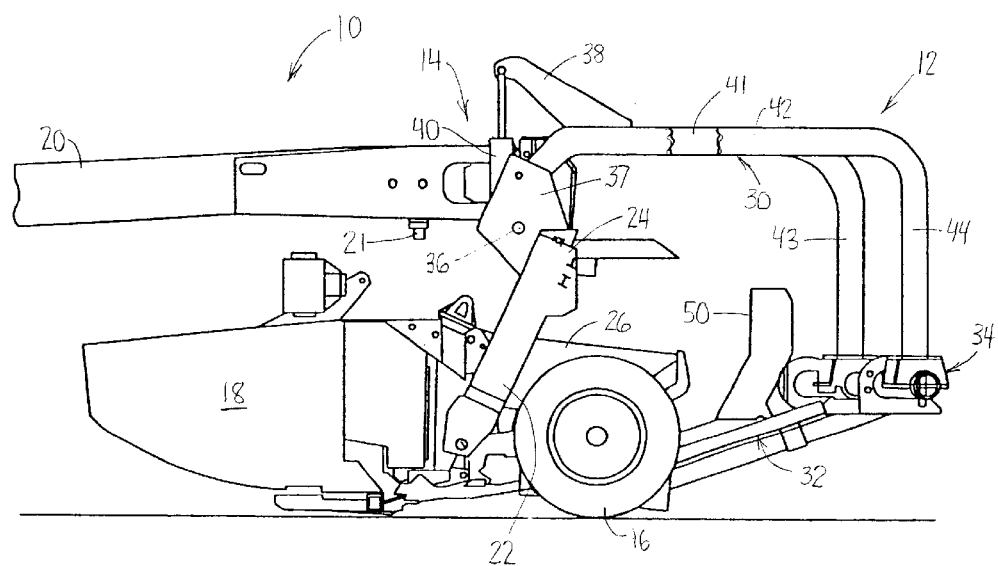
FIG. 1 is a left side view of a mowing implement having a windrow grouper arrangement, constructed in accordance with the principles of the present invention, mounted thereto and shown in its lowered working position.
Figure 2:
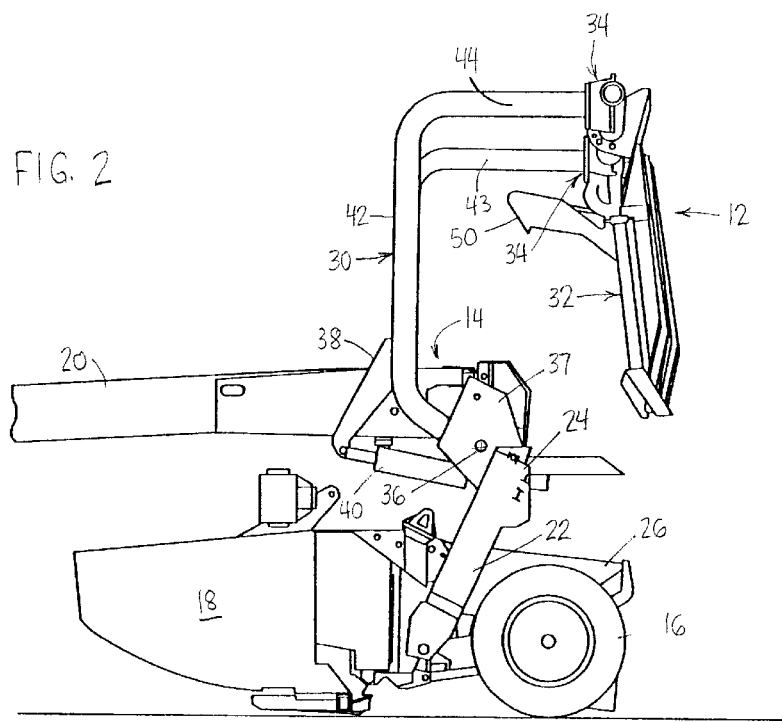
FIG. 2 is a view like that of FIG. 1, but showing the windrow grouper arrangement in a raised non-working position.

Referring now to FIGS. 1 and 2, there is shown a mowing implement 10 having a windrow grouper arrangement 12 mounted thereon. The mowing implement 10 is configured as a pull-type mower-conditioner, that can be towed behind a towing vehicle, for example, an agricultural tractor. The mowing implement 10 also exhibits a width that does not permit it to operate on public roads in the condition shown in FIG. 1. Obviously, the invention is also applicable to mowing implement that are narrower than the allowable transport width.

The implement 10 includes a main frame or chassis 14 supported for traveling over the ground by wheels 16. A mowing platform 18 is suspended from the chassis 14 in a manner (not shown) well known in the art. A tongue 20 has a rear end portion mounted to the chassis 14 by a vertical pin 21 and extends forward from the chassis 14 to a forward end (not shown) that is adapted for attachment to a towing vehicle. The chassis 14 is in the form of an inverted "U", including legs 22 joined to opposite ends of a transverse beam 24 and having lower ends respectively pivotally coupled to a pair of wheel support arms which may be swung vertically and to the rear ends of which the wheels 16 are mounted for free rotation. Extending rearwardly between the legs 22 from a transverse cutterbar of the platform 18 and defined by a hood structure 26 is a crop outlet which leads to the windrow grouper arrangement 12.

The windrow grouper arrangement 12 includes a supporting frame 30, a belt conveyor arrangement 32 and several joints 34 that can be pivoted vertically as a unit about a bearing 36 located in a mounting bracket 37 fixed to the transverse beam 24 of the chassis 14. The frame 30 is provided whit a bracket 38 that extends above the bearing 36, as viewed in FIG. 1, and mounted between the chassis 14 and the bracket 38 is an extensible and retractable hydraulic motor 40 which is selectively operable for pivoting the grouper arrangement 12 between a lowered operating or working position, as shown in FIG. 1, and a raised non-operating or non-working position, as shown in FIG. 2.

When in its lowered working position, the grouper arrangement 12 conveys mowed crop delivered by the platform 18 to a location alongside the platform 18 so that a double windrow is formed during the next pass of the mowing implement 10 with the grouper arrangement raised to the non-working position.

The frame 30 includes a parallel pair of transversely spaced, elongate tubular members including respective main intermediate sections 41 and 42, which extend horizontally as viewed in FIG. 1 and are joined to vertical rear end sections 43 and 44, each of which has a joint 34 at its lower end. Forward sections of the tubular members are mounted to the bearing 36 and extend up and to the rear from there and are respectively joined to front ends of the intermediate sections 41 and 42.

Figure 3:
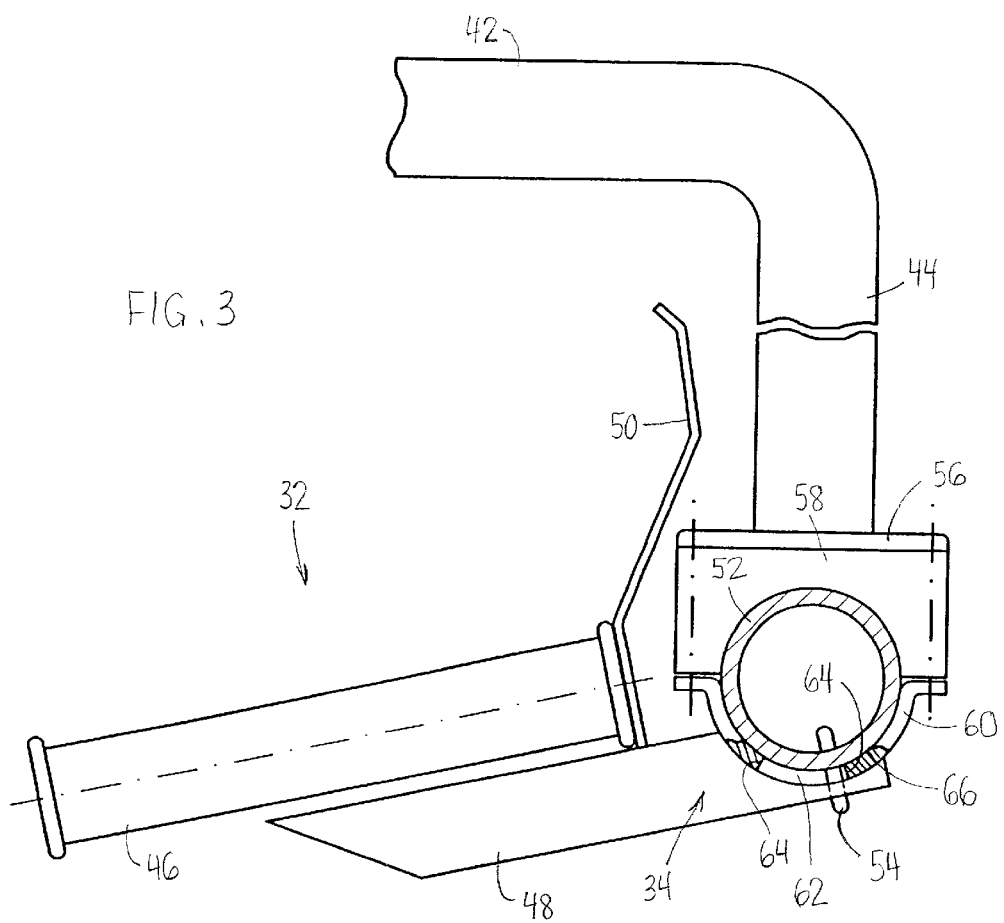
FIG. 3 is an axial, left end view, with parts in section, showing the pivotal connection between the belt conveyor and mounting frame of the grouper arrangement.

As can best be seen in FIG. 3, the conveyor arrangement 32 includes a conveyor belt 46 having a plane conveying surface that is retained on several carriers 48 and is driven in a manner not described but known in itself. The conveyor belt 46 is provided with a slight inclination directed forward towards the ground. Alongside the rear side of the conveyor belt 46, a wall 50 is provided that prevents mowed crop thrown upon the conveyor belt 46 from falling down towards the rear and damaging or fouling the operation of the joints 34. The carriers 48 are welded or screwed to, and extend generally tangential to, a support tube 52. In the region of the joints 34, an abutment 54, extends radially from the tube 52. The abutment 54 may be configured as a pin, a journal, screw, cam or the like and is rigidly and stably, not necessarily unremovably, connected to the tube 52 for oscillating movement therewith.

The joints 34 are located on flanges 56 fixed to the lower ends of the frame sections 43 and 44. Each joint 34 includes upper and a lower half shells 58 and 60, respectively, that can be connected to each other by screws, not shown, and form a bearing 66 in the interior enclosed by them, which engages the tube 52 and permits the latter to oscillate therein. The upper half shell 58 is attached to the flange 56 with screws and is concave downward. The lower half shell 60 is configured in the form of a strap and is provided with a recess 62 in the form of an elongate hole, through which the abutment 54 extends and each of whose ends form a stop 64 which is contacted by the abutment 54 so as to limit the freedom of the pivotal movement of the support tube 52, and hence the conveying arrangement 32 to the frame 30.

Assuming the mowing implement 10 and windrow grouper arrangement 12 to be operating in the condition illustrated in FIG. 1, the conveying arrangement 32 is moved due to the force of gravity in a counterclockwise direction in the bearing 66 about the axis of rotation of the tube 52 in the joints 34. In this position, the abutment 54 contacts the stop 64 formed by the right-hand end surface of the slot 62, as shown in FIG. 3. If the conveying arrangement 32 and the frame 30 are pivoted into the non-operating position shown in FIG. 2, the conveying arrangement 32 will initially retain its relative position with respect to the frame 30, but as the frame sections 43 and 44 approach the horizontal, the conveying arrangement 32 will gravitate clockwise to a position where the abutment 54 engages the stop 64 at the opposite end of the slot 62 from that shown in FIG. 3. Thus, the conveying arrangement 32, in particular the conveyor belt 46, continuously endeavors to attain a vertical position under the joints 34 and therefore does not project towards the rear beyond the frame 30. In the position shown in FIG. 2, the frame sections 43 and 44 extend horizontally above the hood structure 26, and hence within the length of the mowing implement 10. The conveying arrangement 32 is then only slightly to the rear of the mowing implement 10 so that endwise transport of the mowing implement and grouper arrangement 12 over the road is possible within legal limits.

Having described the preferred embodiment, it will become apparent that various modifications can be made without departing from the scope of the invention as defined in the accompanying claims.

What is claimed is:

1. In a combination including a mowing implement capable of forming a windrow therebehind and a windrow grouper arrangement mounted on the mowing implement for pivoting vertically between a lowered working position wherein crop discharged by the mowing implement is intercepted and conveyed sideways to form a windrow beside said implement and wherein a majority of a first fore-and-aft dimension of said windrow grouper arrangement is located behind a vertical, transverse plane located at a rear end of said moving implement, and a raised non-working position wherein crop passes beneath said windrow grouper arrangement to form a windrow, the improvement comprising: said windrow grouper arrangement including a frame and pivot arrangement establishing said non-working position at a location wherein said windrow grouper arrangement has a rear end located approximately at said vertical transverse plane at said rear end of said mowing implement.

2. The combination defined in claim 1 wherein said windrow grouper arrangement includes a conveyor belt arrangement.

3. The combination defined in claim 1 wherein said frame and pivot arrangement includes a support frame which, when said grouper arrangement is considered in its working position, has a first section extending generally horizontally over a rear portion of said mowing implement and being joined to a second section extending substantially vertically; and a conveying arrangement being mounted to and extending forward from a lower region of said second section.

4. The combination defined in claim 3 wherein said pivot arrangement includes a pivot structure coupling said conveying arrangement to said lower region of said second section of said frame so as to establish a limited amount of free pivotal movement of said conveying arrangement relative to said second section of said frame; and said conveying arrangement being located relative to said pivot structure such that gravity acting on said conveying arrangement positions said conveying arrangement for working when said frame is in its working position, and positions said conveying arrangement in a substantial vertical alignment with said second section of said frame when said frame is raised to its non-working position.

5. The combination defined in claim 4 wherein said conveying arrangement includes a belt conveyor that is inclined downwardly and forwardly from said lower region of said second section of said support frame when said grouper arrangement is in said working position; and said conveying arrangement including an upright shield located along a backside of said belt conveyor ahead of said pivot structure so that crop material is prevented from falling on said pivot structure.

6. The combination defined in claim 3 wherein said conveying arrangement includes a frame defined in part by a cylindrical member; said pivot structure including an upper cylindrical shell fixed to said lower region of said second section of said mounting frame and engaged with an upper region of said cylindrical member; a lower cylindrical shell engaged with a lower region of said cylindrical member and fixed to said upper cylindrical shell and cooperating therewith to define a bearing surface within which said cylindrical member may pivot; said cylindrical member having an abutment projecting therefrom; and one of said upper and lower cylindrical shells presenting angularly spaced stop surfaces located on opposite sides of said abutment with gravitational force acting on said conveying arrangement and biasing said abutment against one of said stops when said grouping arrangement is in said working position, and biasing said abutment against another of said stops when said grouping arrangement is in said non-working position.

7. The combination defined in claim 6 wherein said abutment extends radially from said cylindrical member;

and said one of said shells having an arcuate slot therein receiving said abutment.

8. In a combination of a windrower and a windrow grouper wherein said windrower includes an inverted "U" shaped main frame having ground wheels mounted to opposite depending legs thereof, and a housing guiding mowed crop material between said legs and said ground wheels for depositing crop to form a windrow, said grouper including a fore-and-aft extending mounting frame having its forward end mounted to said main frame for vertical movement between a lowered working position and a raised transport position, and having its rear end coupled to a conveying arrangement disposed for intercepting crop exiting said housing when said mounting frame is in said working position and conveying said crop sideways to form a windrow alongside said windrower, the improvement comprising: said mounting frame and conveying arrangement being constructed and arranged relative to each other and said windrower such that said conveying arrangement is located within a zone bounded at a front side by said ground wheels and bounded at a rear side by a rear portion of said mounting frame when said mounting frame is in said working position; and said conveying arrangement is located no further rearward than said zone when said mounting frame is in said raised non-working position.

9. The combination defined in claim 8 and further including cooperating first and second pivot-defining structures respectively carried by said rear portion of said mounting frame and said conveying structure and defining a pivotal connection having angularly spaced stops for permitting free movement of said conveying arrangement between said stops such that gravity acting on said conveying arrangement biases the latter to a working position against one of said stops, and biases the latter to a non-working position against another of said stops, with the movement of said conveying arrangement from said one, to said another, of said stops resulting in said conveying arrangement moving closer to said windrower.

10. The combination defined in claim 9 and further including a crop deflecting wall located in front of said pivotal connection when said mounting frame is in said working position.

* * * * *